United States Patent
Lee et al.

(10) Patent No.: US 8,258,984 B2
(45) Date of Patent: Sep. 4, 2012

(54) LIGHT GUIDE AND THIN FILM KEYBOARD HAVING THE SAME

(75) Inventors: Cheng-Ju Lee, Taipei Hsien (TW); Chih-Feng Yeh, Taipei Hsien (TW)

(73) Assignee: Wistron Corporation (TW)

( * ) Notice: Subject to any disclaimer, the term of this patent is extended or adjusted under 35 U.S.C. 154(b) by 497 days.

(21) Appl. No.: 12/617,783

(22) Filed: Nov. 13, 2009

(65) Prior Publication Data

US 2010/0328108 A1    Dec. 30, 2010

(30) Foreign Application Priority Data

Jun. 25, 2009    (TW) ............................... 98211451 U (51) Int. Cl.
*H03K 17/94* (2006.01)
*F21V 13/02* (2006.01)
*F21V 8/00* (2006.01)

(52) U.S. Cl. .............................. 341/22; 362/27; 362/602

(58) Field of Classification Search .................... 341/22; 362/26, 27, 602

See application file for complete search history.

(56) References Cited

U.S. PATENT DOCUMENTS

| | | | | |
|---|---|---|---|---|
| 5,746,493 A * | 5/1998 | Jonsson et al. | ................ | 362/602 |
| 6,598,987 B1 * | 7/2003 | Parikka | ........................... | 362/26 |
| 6,910,783 B2 * | 6/2005 | Mezei et al. | .................. | 362/615 |
| 2004/0130912 A1 * | 7/2004 | Miyashita | ..................... | 362/561 |
| 2005/0073824 A1 * | 4/2005 | Kuo | .............................. | 362/24 |
| 2009/0256726 A1 * | 10/2009 | Tsai | ................................ | 341/22 |
| 2011/0149595 A1 * | 6/2011 | Lin et al. | ...................... | 362/606 |

* cited by examiner

*Primary Examiner* — Howard Williams
(74) *Attorney, Agent, or Firm* — Ostrolenk Faber LLP (57) ABSTRACT

A light guide includes a main body and a curved refracting face formed in the main body. As light enters the main body, a bright zone and a secondary bright zone less brighter than the bright zone are formed in the main body. The curved refracting face can be an inner wall face of a curved groove or a cavity disposed in the main body. Through the formation of the curved refracting face, the light in the secondary bright zone can be directed such that, when the light guide is disposed in a thin film keyboard, the brightness of a portion of the keyboard that corresponds to the secondary bright zone has improved brightness.

6 Claims, 6 Drawing Sheets

LIGHT GUIDE AND THIN FILM KEYBOARD HAVING THE SAME

CROSS-REFERENCE TO RELATED APPLICATION

This application claims priority of Taiwanese Application No. 098211451, filed on Jun. 25, 2009.

BACKGROUND OF THE INVENTION

1. Field of the Invention

The present invention relates to a light guide and a thin film keyboard with the light guide, more particularly to a light guide capable of enhancing brightness at parts thereof and to a thin film keyboard with the light guide.

2. Description of the Related Art

Figure 1:
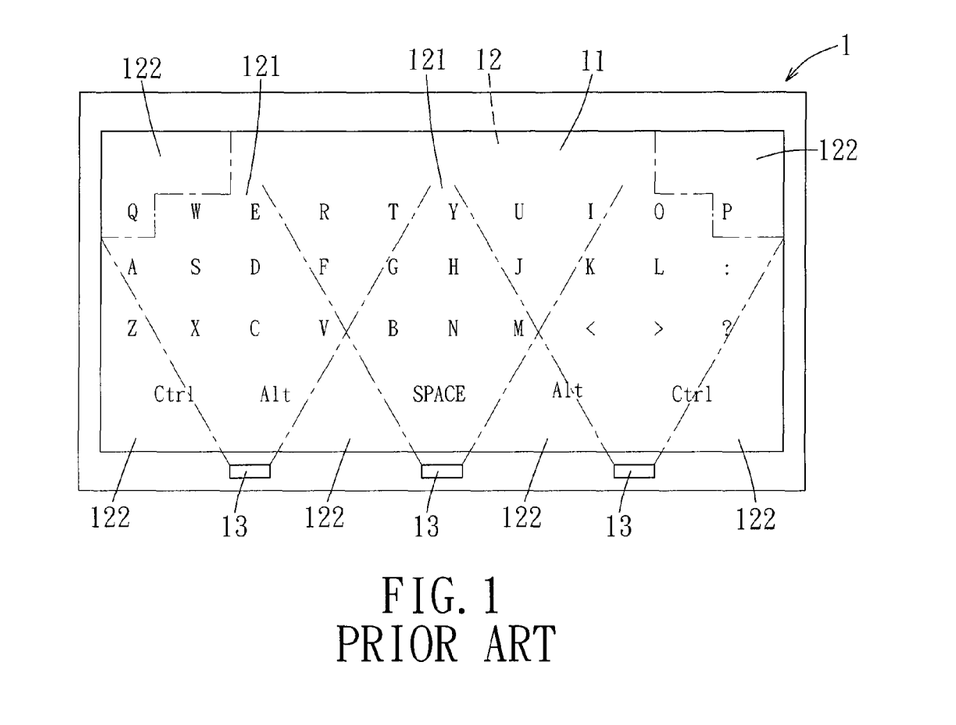
FIG. 1 is a schematic view of a thin film keyboard of a typical electronic device.

Referring to FIG. 1, a thin film keyboard 1 of a typical electronic device such as a cell phone generally includes a keyboard surface layer 11, a light guide 12 that is disposed under the keyboard surface layer 11, and one or more light-emitting components 13 (such as light-emitting diodes) which emit incident light that enters from one side of the light guide 12. The keyboard surface layer 11 is generally printed with numerals, letters, etc. As the light-emitting components 13 emit light into the light guide 12, the light guide 12 illuminates the keyboard surface layer 11 such that the numerals and symbols on the keyboard surface layer 11 appear more visible in a dim environment.

Nevertheless, due to the dimensions of the light guide 12 and the characteristics of light-emitting angle of the light-emitting components 13, as the light-emitting components 13 emit light into the light guide 12, bright zones 121 and secondary bright zones 122 less brighter than the bright zones 121 are formed in the light guide 12. As shown in FIG. 1, the secondary bright zones 122 are formed proximate to the two lateral sides of each of the light-emitting components 13 and proximate to the corners of the light guide 12 away from the light-emitting components 13. Moreover, if opaque ink is used in printing the keyboard surface layer 11, lower illumination brightness is provided to the numerals or symbols by the secondary bright zones 122.

Figure 2:
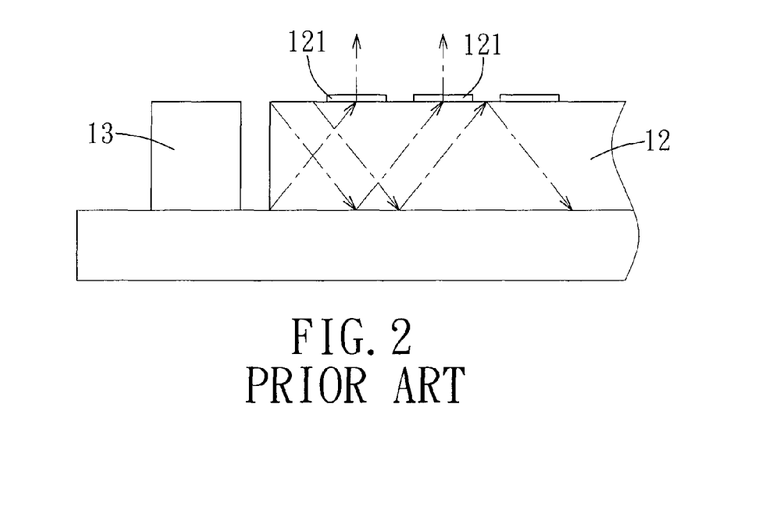
FIG. 2 is a schematic view of a conventional light guide with top face printing.
Figure 3:
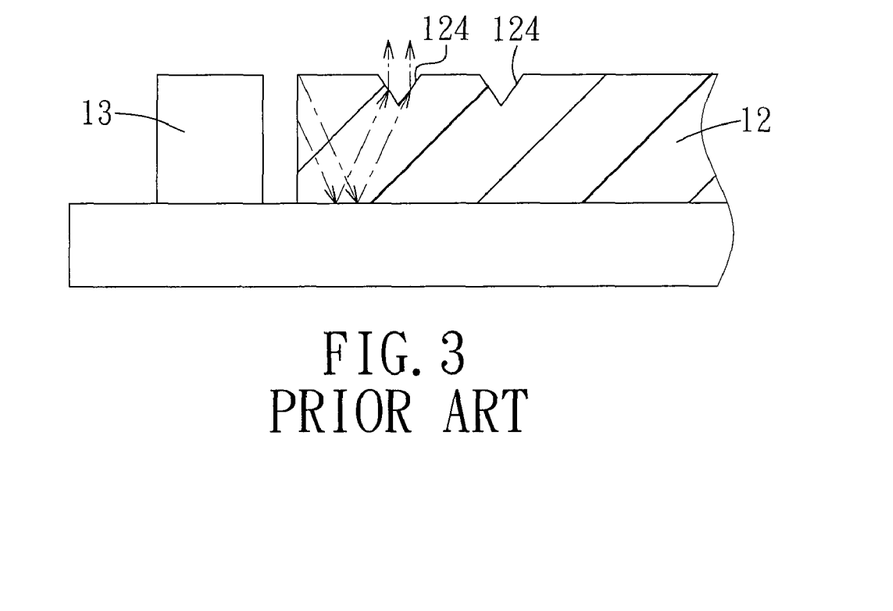
FIG. 3 is a sectional view of a conventional light guide with V-shaped grooves disposed in a top face thereof.
Figure 4:
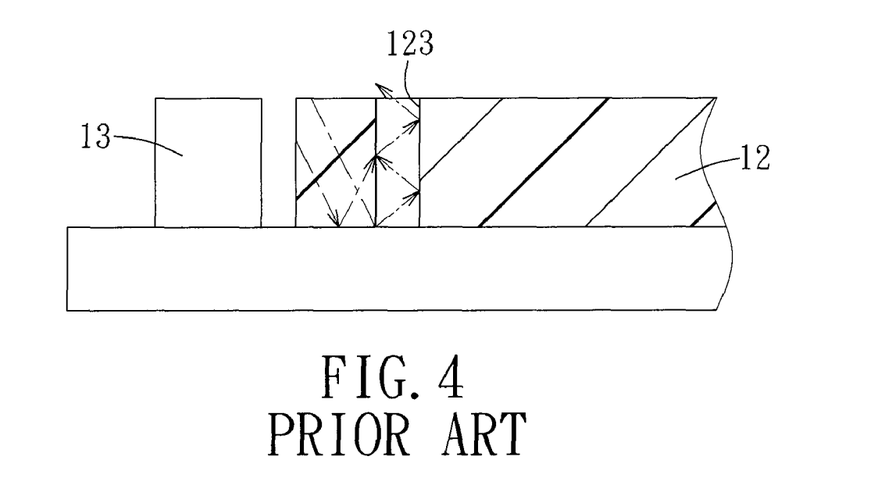
FIG. 4 is a sectional view of a conventional light guide with cylindrical holes disposed in a main body thereof.

Referring to FIGS. 2 and 4, current approaches to resolve the problem described hereinabove include printing 121 on a top face of a light guide 12 (illustrated in FIG. 2), forming V-shaped grooves 124 in a top face of a light guide 12 (illustrated in FIG. 3), and forming cylindrical holes 123 in a light guide 12 (illustrated in FIG. 4). Although these approaches attempt to refract a portion of incident light from the light-emitting components 13 in the light guide 12 toward and out of the secondary bright zones 122, the control of the locations toward which the refracted light is directed is compromised, and hence the increase in brightness is limited.

SUMMARY OF THE INVENTION

Therefore, an object of the present invention is to provide a light guide that is capable of focusing light locally and controlling the location toward which the light is focused.

Another object of the present invention is to provide a thin film keyboard with the light guide.

Accordingly, the thin film keyboard of the present invention includes a circuit unit, a light guide, and a keyboard surface layer. The circuit unit includes a circuit board and a light-emitting component that is disposed on the circuit board. The light guide is disposed on the circuit board, and includes a main body and a curved groove disposed in the main body. The main body has a top face, a bottom face that faces the circuit board, and a light incident lateral face that faces the light-emitting component. The curved groove is disposed between the top face and the bottom face of the main body, and has a first curved refracting face that defines a convex-side zone and a concave-side zone in the main body. The keyboard surface layer is disposed on the top face of the main body of the light guide, and has an upper surface provided with a plurality of press parts for pressing. One of said press parts is disposed proximate to the concave-side zone.

Preferably, the curved groove extends through the top face and the bottom face of the main body.

Preferably, the curved groove extends through the top face of the main body of the light guide. The bottom face of the main body is formed with a cavity that is in spatial communication with the curved groove and that has an inner wall face. A portion of the inner wall face is a sunken curved face and defines a second curved refracting face that is connected to the first curved refracting face of the curved groove.

According to another aspect, the thin film keyboard of the present invention includes a circuit unit, a light guide, and a keyboard surface layer. The circuit unit includes a circuit board and a light-emitting component that is disposed on the circuit board. The light guide is disposed on the circuit board and includes a main body and a cavity. The main body has a top face, a bottom face that faces the circuit board, and a light incident lateral face that faces the light-emitting component. The cavity sinks from the bottom face of the main body, and has a curved refracting face that is in a shape of a sunken curved face and that defines a convex-side zone and a concave-side zone in the main body. The keyboard surface layer is disposed on the top face of the main body of the light guide, and has an upper surface provided with a plurality of press parts for pressing. One of the press parts is disposed above the cavity.

Preferably, the cavity extends through the top face of the main body.

In the present invention, the curved refracting face in the light guide is capable of directing light that passes through the curved refracting face to one area in the main body, and hence can enhance the brightness of the press part that corresponds to and that is disposed above the curved refracting face.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in detail, it should be noted that like elements are denoted by the same reference numerals throughout the disclosure.

Figure 5:
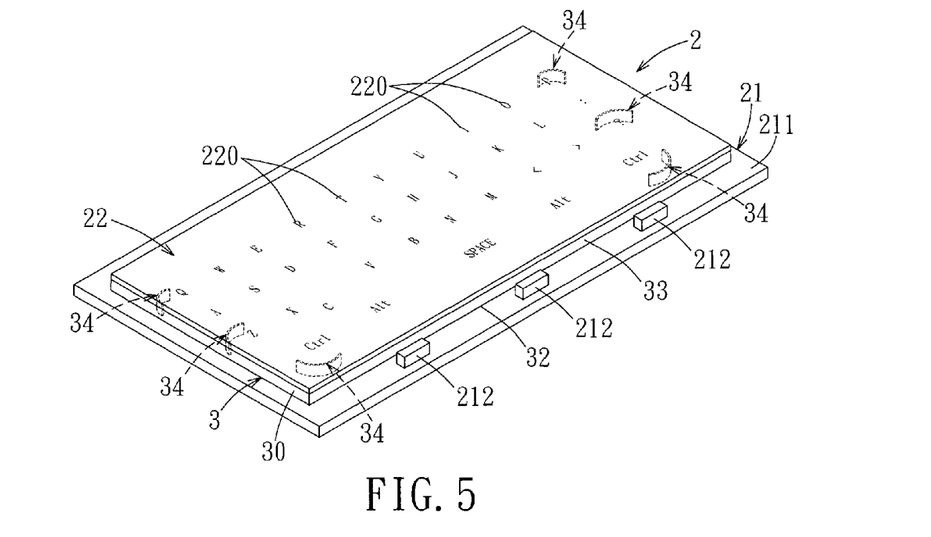
FIG. 5 is a perspective view to illustrate the first preferred embodiment of a thin film keyboard according to this invention.
Figure 6:
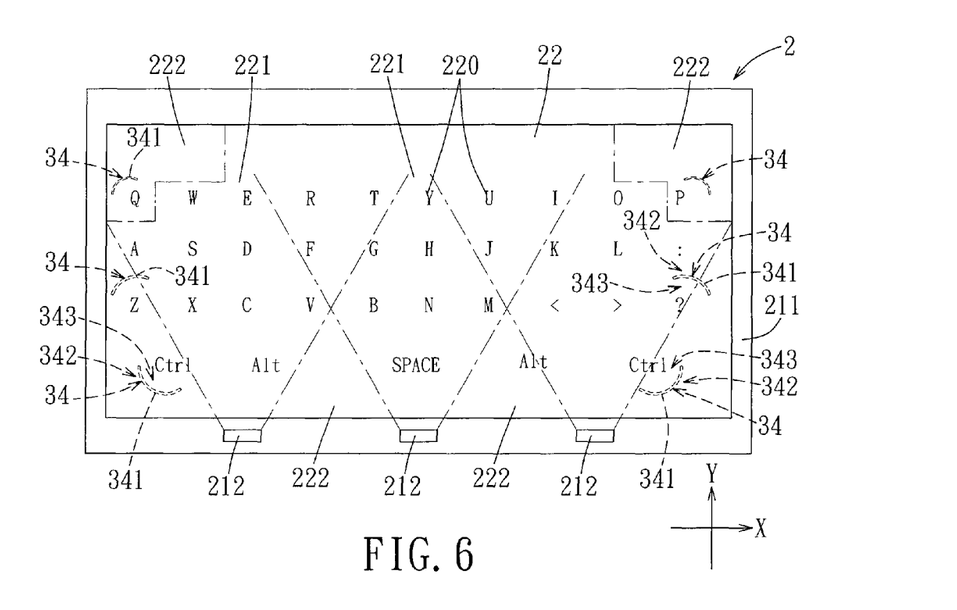
FIG. 6 is a schematic view to illustrate the first preferred embodiment of a thin film keyboard viewed from the top.
Figure 7:
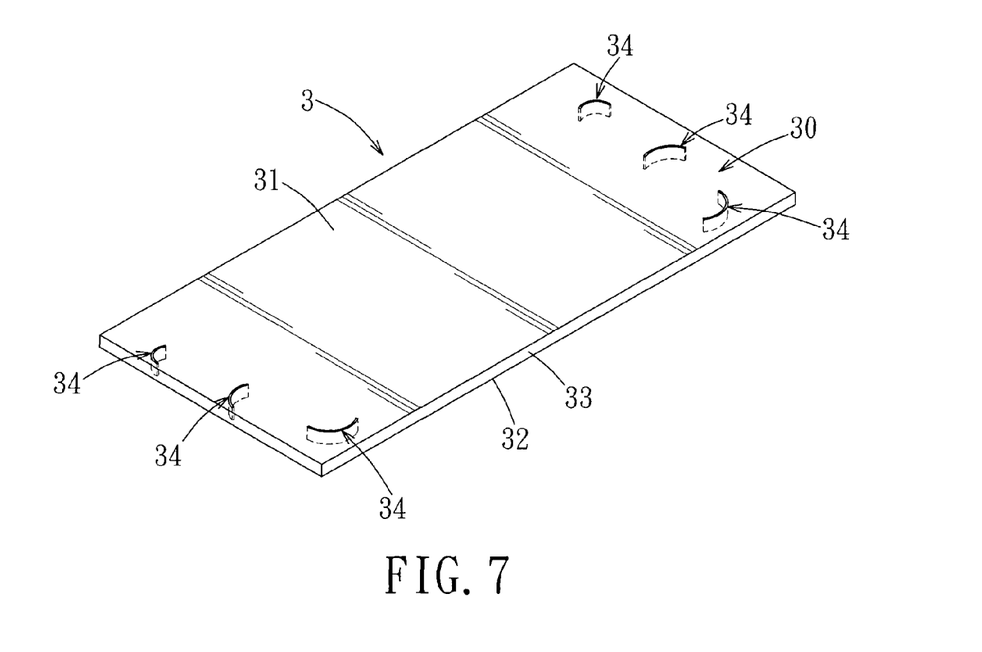
FIG. 7 is a perspective view of the first preferred embodiment of a light guide according to the invention.

Referring to FIGS. 5, 6, and 7, the first preferred embodiment of a thin film keyboard 2 according to the present invention includes a circuit unit 21, a light guide 3, and a keyboard surface layer 22. Of course, the thin film keyboard 2 may also include other components that ensure the normal operation of the thin film keyboard 2.

In the present embodiment, the circuit unit 21 includes a circuit board 211, at least one light-emitting component 212 that is disposed on the circuit board 211, and a plurality of tactile parts (not shown) that are disposed on the circuit board 211. In the present embodiment, the light-emitting components 212 are light-emitting diodes and are soldered onto the circuit board 211. The tactile parts can be metallic dome contact members that are disposed on the circuit board 211 and that can provide trigger signals upon pressing.

The light guide 3 is disposed on the circuit board 211 and includes a main body 30 and a plurality of curved grooves 34 that are formed in the main body 30. The main body 30 has a top face 31, a bottom face 32 that faces the circuit board 211, and a light incident lateral face 33. The light incident lateral face 33 faces the light-emitting components 212 and can receive light therefrom. As the light-emitting components 212 emit light toward the light incident lateral face 33, bright zones 221 and secondary bright zones 222 that are less brighter than the bright zones 221 are formed in the main body 30. The bright zones 221 are the zones of the main body 30 that face the light-emitting components 212 (i.e., as shown in FIG. 6, the zones that are inside the pairs of dashed lines that radiate from the light-emitting components 212). The secondary bright zones 222 are the zones of the main body 30 that are proximate to the two lateral sides of each of the light-emitting components 212 (i.e., as shown in FIG. 6, the zones that are outside the pairs of dashed lines that radiate from the light-emitting components 212) and the zones that are proximate to the corners of the main body 30 away from the light-emitting components 212.

The curved grooves 34 are disposed between the top face 31 and the bottom face 32 of the main body 30. The locations of curved grooves 34 are partially or entirely in the secondary bright zones 222. In the present embodiment, each of the curved grooves 34 extends through the top face 31 and the bottom face 32 of the main body 30. Each of the curved grooves 34 has a curved refracting face 341 that defines a convex-side zone 342 and a concave-side zone 343 in the main body 30. In the present embodiment, the convex-side zone 342 is the zone toward which the curved refracting face 341 appears to bulge. On the other hand, the concave-side zone 343 is the zone from which the curved refracting face 341 appears to be recessed. As light enters from the light incident lateral face 33 into the main body 30, light traveling toward the convex-side zone 342 is refracted in the X-Y plane by the curved refracting face 341 toward the concave-side zone 343, the refraction being of the same principle as a convex lens refraction.

The keyboard surface layer 22 is disposed on the top face 31 of the main body 30 to serve as a keyboard surface for pressing. An upper surface of the keyboard surface layer 22 has a plurality of press parts 220. Depending on the purpose of the thin film keyboard, each of the press parts 220 is one of a letter, numeral, a symbol, and a pattern printed on the upper surface of the keyboard surface layer 22. The thin film keyboard 22 can be entirely or have at least the press parts 220 made of a light-transmissive material. Furthermore, as the keyboard surface layer 22 is disposed on the light guide 3, several of the press parts 220 on the keyboard surface layer 22 are proximate to the concave-side zones 343 of the curved grooves 34 of the light guide 3. In other words, when disposing the curved grooves 34 of the light guide 3, the positions thereof correspond to the press parts 220 of the keyboard surface layer 22 that are likely to be in the secondary bright zones 222.

Figure 8:
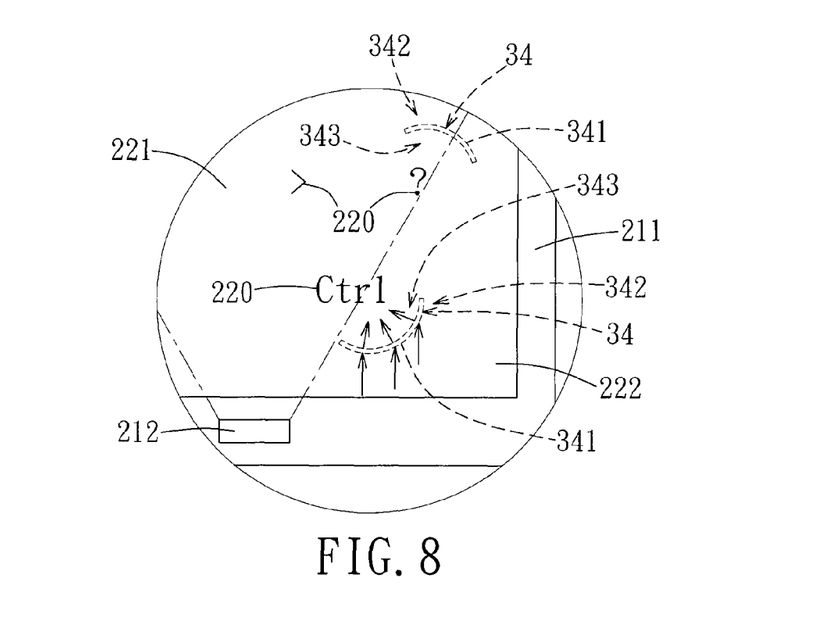
FIG. 8 is an enlarged view of a portion in FIG. 6.

Referring to FIG. 8, as the light-emitting components 212 emit light toward the light incident lateral face 33 of the main body 30 of the light guide 3, the bright zones 221 and the secondary bright zones 222 are formed such that several of the press parts 220 of the keyboard surface layer 22 are in the secondary bright zones 222. However, through the arrangement of the curved grooves 34 in the main body 30 of the light guide 3, light in the secondary bright zones 222 is directed toward the concave-side zones 343. As a result, the brightness of the secondary bright zones 222 of the light guide 3 is increased, and thus the press parts 220 of the keyboard surface layer 22 that are in the secondary bright zones 222 have improved brightness. Furthermore, because the curved refracting faces 341 of the curved grooves 34 extend from the top face 31 to the bottom face 32 of the main body 30 of the light guide 3, a wider range of light can be directed and hence the higher brightness can be achieved.

Therefore, as described heretofore, through disposing the curved grooves 34 at the secondary bright zones 222 of the main body 30 of the light guide 3, the curved refracting faces 341 are formed. The curved refracting faces 341 improve the brightness of the press parts 220 of the keyboard surface layer 22 that correspond with and that are disposed above the curved refracting faces 341. In addition, by adjusting the radii and hence the curvatures of the curved grooves 34, the locations toward which the directed light are focused can be adjusted.

Figure 9:
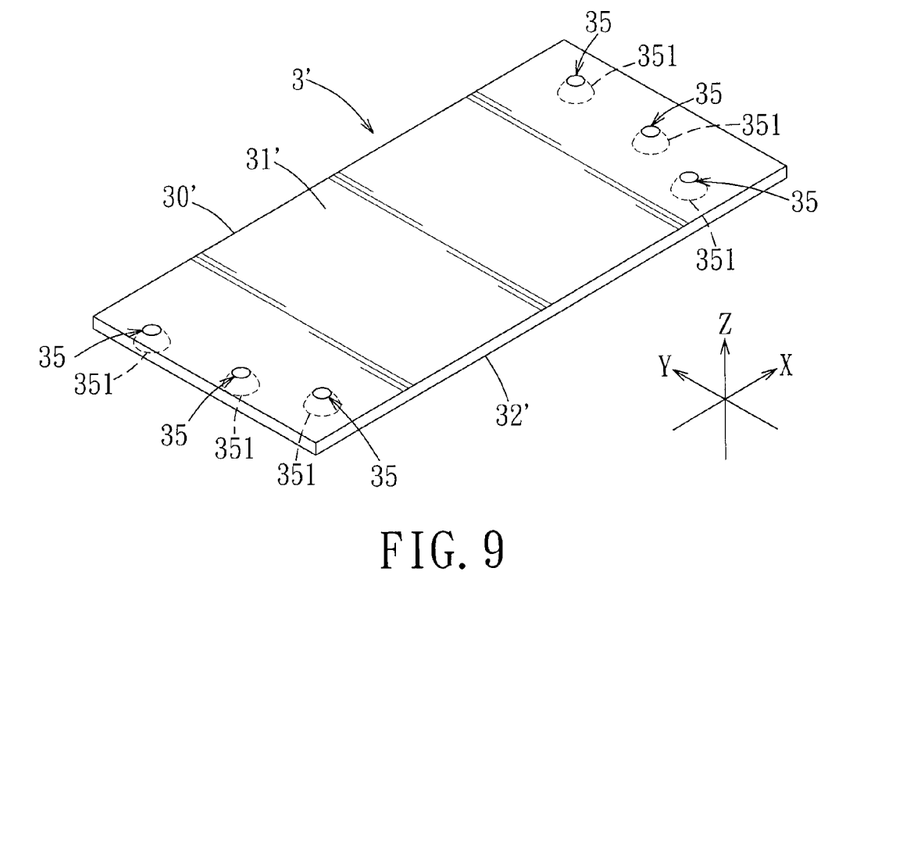
FIG. 9 is a perspective view of the second preferred embodiment of a light guide according to the invention.
Figure 10:
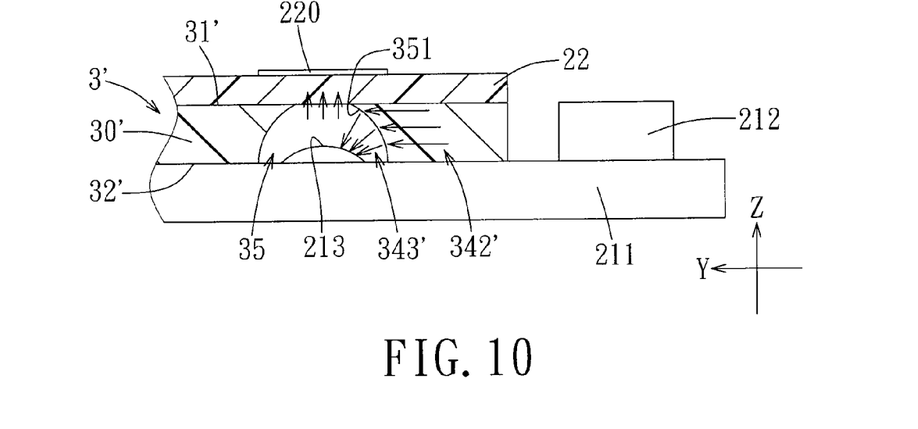
FIG. 10 is a fragmentary partly sectional view of the second preferred embodiment of a thin film keyboard according to the invention.

FIGS. 9 and 10 illustrate the second preferred embodiment of the present invention, wherein, as compared with the first preferred embodiment, a different light refracting mechanism is used in the light guide. In the second preferred embodiment, the bottom face 32' of the main body 30' of the light guide 3' is recessed and is formed with a plurality of cavities 35. The cavities 35 replace the curved grooves 34 of the main body 30 of the light guide 3 of the first preferred embodiment such that the press parts 220 on the keyboard surface layer 22 are disposed above the cavities 35. Each of the cavities 35 sinks from the bottom face 32' of the main body 30' and is formed with a shape of a sunken curved face. The sunken curved face of each of the cavities 35 defines a curved refracting face 351. The convex-side zone 342' is the zone toward which the curved refracting face 351 appears to bulge. On the other hand, the concave-side zone 343' is the zone from which the curved refracting face 351 appears to be recessed. Preferably, each cavity 35 extends through the top face 31' of the main body 30' of the light guide 3'.

As shown in FIG. 8, light passing through the curved refracting face 341 of the first preferred embodiment is refracted only in the X-Y plane. Whereas, in the second embodiment, the curved refracting faces 351 of the cavities 35 are curved in the three dimensions and thus are capable of refracting light in the direction of the Z-axis, in addition to the X-Y plane, toward the concave-side zones 343'. Thus, the brightness of the secondary bright zones of the main body 30' of the light guide 3' is improved, and hence the press parts 220 of the keyboard surface layer 22 that are disposed in the secondary bright zones 222 have improved brightness.

Preferably, in the second preferred embodiment, when the light guide 3' is disposed on the circuit board 211, the locations of the cavities 35 correspond to the tactile parts 213 (metallic dome contact members) on the circuit board 211. That is to say, the tactile parts 213 are disposed in the cavities 35. If the tactile parts 213 are made of a material that has better light reflectivity, more light can be directed toward the press parts 220 of the keyboard surface layer 22 to further increase the brightness.

Figure 11:
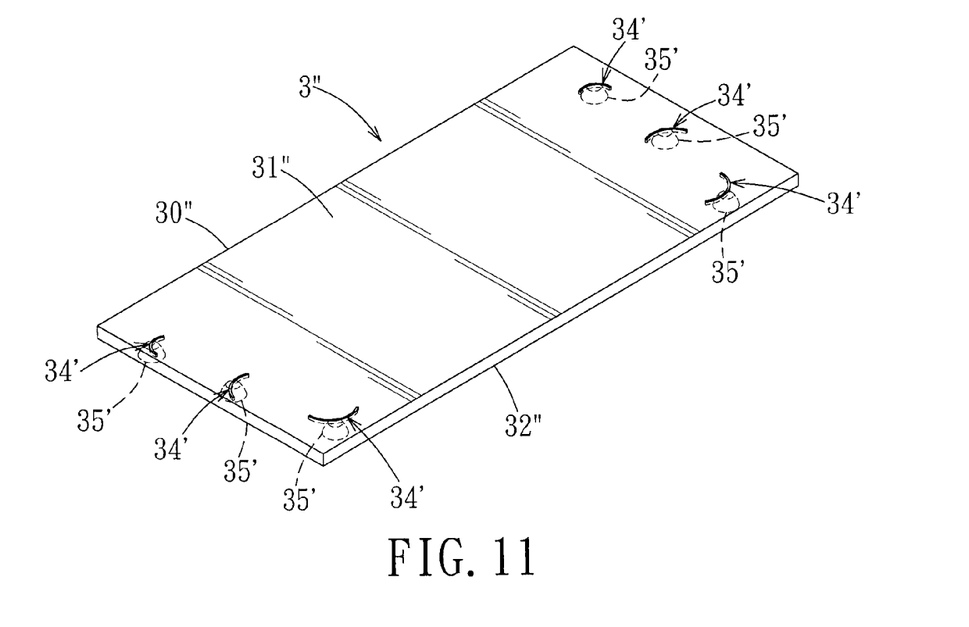
FIG. 11 is a perspective view of the third preferred embodiment of a light guide according to the invention.
Figure 12:
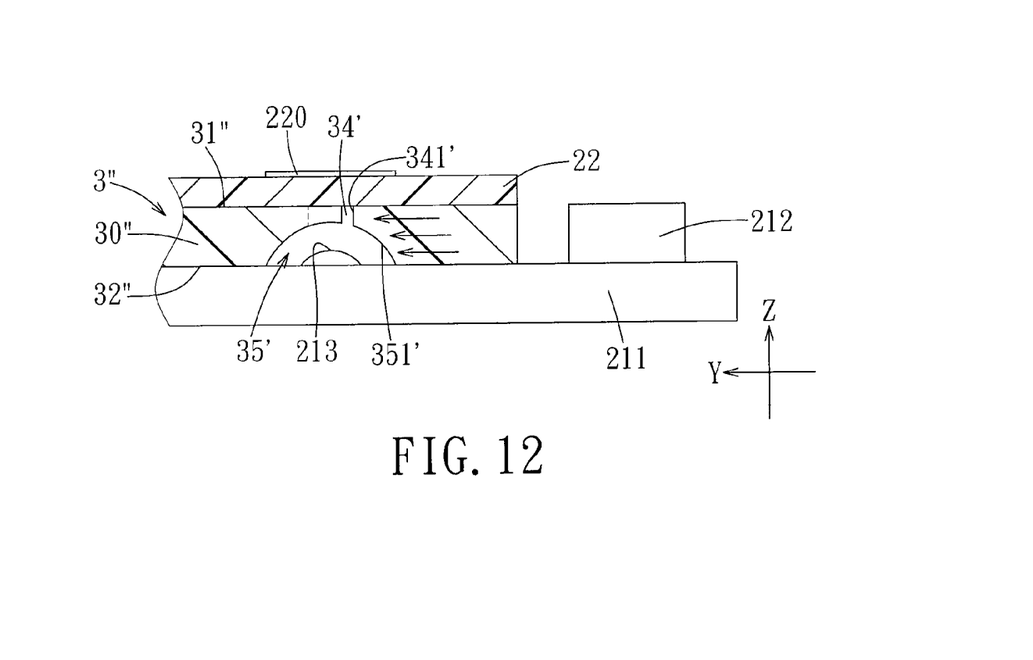
FIG. 12 is a fragmentary partly sectional view of the third preferred embodiment of a thin film keyboard according to the invention.

Referring to FIGS. 11 and 12, in the third preferred embodiment of a light guide according to the present invention, a light guide 3" includes a main body 30", a plurality of curved grooves 34' that are disposed in the main body 30", and a plurality of cavities 35' that are disposed under and that are in spatial communication with the respective curved grooves 34'. Each of the curved grooves 34' extends through the top face 31" of the main body 30" and has a first curved refracting face 341'. Each of the cavities 35' is formed at the bottom face 32" of the main body 30", is in spatial communication with one of the curved grooves 34', and has a second curved refracting face 351'. The configuration of the curved grooves 34' can be identical to that in the first preferred embodiment. On the other hand, the configuration of the cavities 35' can be identical to that in the second preferred embodiment. In other words, in the third preferred embodiment, the curved refracting face 341 of the first preferred embodiment and the curved refracting face 351 of the second preferred embodiment are combined together. In particular, the first curved refracting face 341' is capable of directing light through refraction in the X-Y plane, whereas the second curved refracting face 351' is capable of directing light through refraction in the three dimensions. Therefore, the third preferred embodiment has the respective effects of the first preferred embodiment and the second preferred embodiment. Thus, brightness of local sections of the light guide 3" is improved, and, consequently, the press parts 220 of the keyboard surface layer 22 that are in the secondary bright zone have improved brightness.

Of course, a portion of the light that is refracted by each of the cavities 35' is reflected by one of the tactile parts 213 toward the corresponding press part 220. This arrangement can direct additional light toward the press parts 220 of the keyboard surface layer 22 and further improve the brightness.

It is noted that, the light guides 3, 3', and 3" of the preferred embodiments can be formed by extrusion molding (0.1 mm-0.3 mm) or injection molding. If formed by extrusion molding, the curved grooves 34 and 34' and the cavities 35 and 35' can be formed by etching, cutting, or punching. Alternatively, if formed by injection molding, the curved grooves 34 and 34' and the cavities 35 and 35' can be formed integrally during the molding process.

Furthermore, each curve can be constituted by a smooth curve, or multiple straight lines (or planes) that are interconnected end-to-end to form a generally curved shape.

In the present invention, through disposing the curved grooves 34, the cavities 35 and 35', or a combination of both in the light guides 3, 3', and 3" to form the curved refracting faces 341, 351, 341', and 351', light in the secondary bright zones 222 can be refracted to improve the brightness of the press parts 220 of the keyboard surface layer 22 that are in the secondary bright zones 222. In addition, the locations where the refracted light is to be directed can be adjusted by adjusting the curvatures of the curved refracting faces 341, 351, 341', and 351'.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A thin film keyboard comprising:
    a circuit unit including a circuit board, and a light-emitting component disposed on said circuit board;
    a light guide disposed on said circuit board and including a main body that has a top face, a bottom face facing said circuit board, and a light incident lateral face facing said light-emitting component, said main body further having a curved groove disposed between said top face and said bottom face of said main body;
    said curved groove extends through said top face of said main body of said light guide, said curved groove having a first curved refracting face that defines a convex-side zone and a concave-side zone in said main body;
    said bottom face of said main body is formed with a cavity that is in spatial communication with said curved groove, said cavity has an inner wall face, a portion of said inner wall face is a sunken curved face and defines a second curved refracting face connected to said first curved refracting face;
    a keyboard surface layer disposed on said top face of said main body of said light guide and having an upper surface provided with a plurality of press parts for pressing, wherein one of said press parts is disposed proximate to said concave-side zone; and
    said one of said press parts proximate to said curved groove is disposed above said cavity.

2. The thin film keyboard as claimed in claim 1, wherein said curved groove also extends through said bottom face of said main body.

3. The thin film keyboard as claimed in claim 1, wherein said circuit unit further includes a plurality of metallic dome contact members that are disposed on said circuit board, said metallic dome contact members correspond respectively to and are disposed under said press parts, and said metallic dome contact member corresponding to said one of said press parts proximate to said concave-side zone is disposed in said cavity.

4. The thin film keyboard as claimed in claim 1, wherein said main body is formed with a bright zone and a secondary bright zone that is less brighter than said bright zone when said light-emitting component emits light toward said light incident lateral face, and said curved groove has at least a portion disposed in said secondary bright zone.

5. A light guide comprising:
    a main body having a top face, a bottom face, and a light incident lateral face; said main body further having a curved groove disposed between said top face and said bottom face of said main body, said curved groove having a first curved refracting face that defines a convex-side zone and a concave-side zone in said main body;
    said curved groove extends through said top face of said main body, said bottom face of said main body is formed with a cavity that is in spatial communication with said curved groove, said cavity has an inner wall face, and a portion of said inner wall face is a sunken curved face and defines a second curved refracting face connected to said first curved refracting face; and wherein when light enters said main body via said light-incident lateral face, light passes through said first curved refracting face from said convex-side zone is refracted and directed to said concave-side zone.

6. The light guide as claimed in claim 5, wherein said curved groove also extends through said bottom face of said main body.

* * * * *